Jan. 13, 1948.  P. E. VAN HORN  2,434,447
GATE
Filed Feb. 14, 1946  2 Sheets-Sheet 1

INVENTOR
PERRY E. VAN HORN
BY Rice and Rice
ATTORNEYS

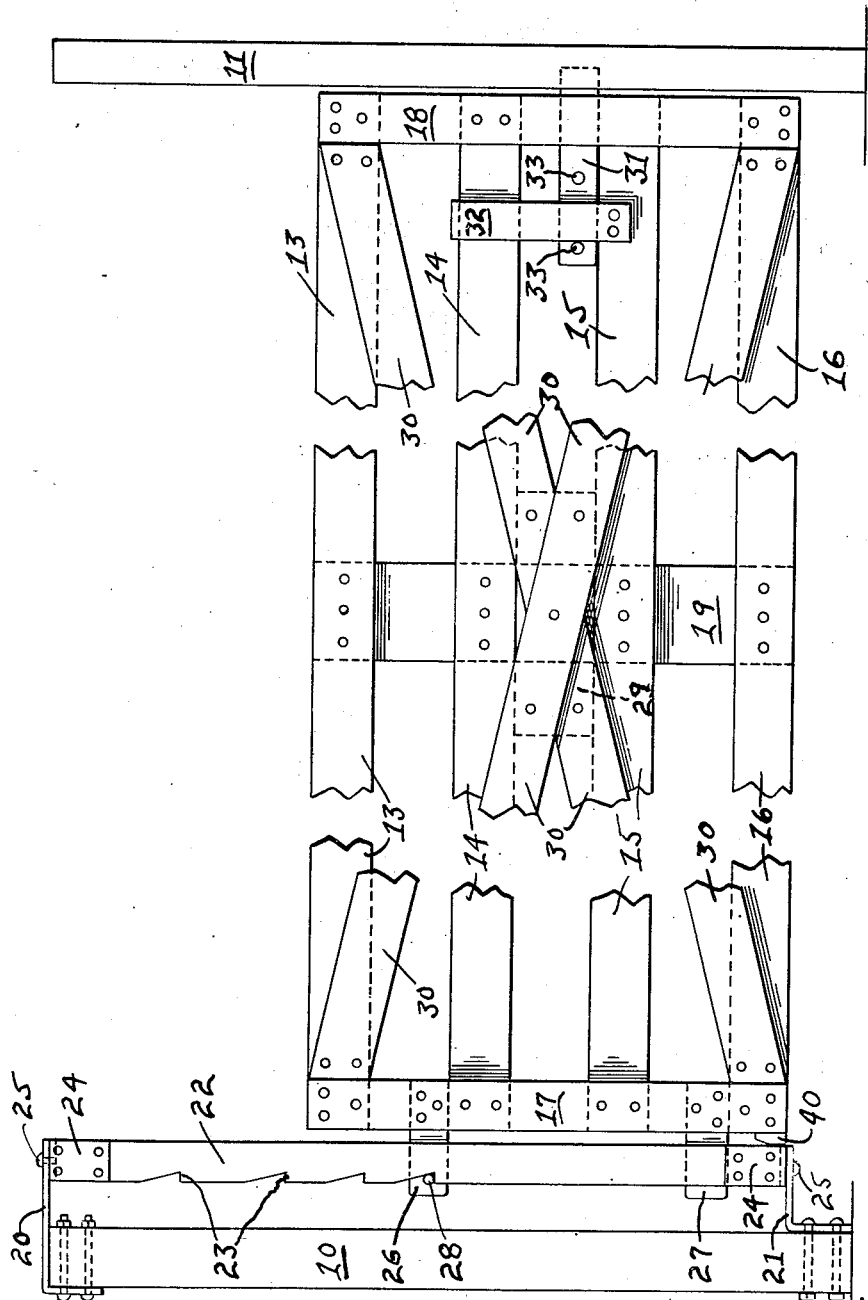

Patented Jan. 13, 1948

2,434,447

UNITED STATES PATENT OFFICE 2,434,447
GATE

Perry E. Van Horn, Grand Rapids, Mich.

Application February 14, 1946, Serial No. 647,584

1 Claim. (Cl. 39—81)

The present invention relates to gates and more particularly to farm gates.

The primary objects of the instant invention are to provide a gate of the general character above indicated which is readily vertically adjustable relative to the ground therebelow; to provide such a gate whose free end cannot sag and thus bind against its adjacent gate post; to provide such a gate which is rugged and sturdy in construction; to provide such a gate which may be conveniently set up for use; and, to provide such a gate which is reasonably economical in manufacture.

Illustrative embodiments of the invention are shown in the accompanying drawings, wherein:

Figure 3 is an enlarged fragmentary front elevational view thereof showing the opposite ends and middle portion of the gate together with the end posts of the gate;

Figure 1:
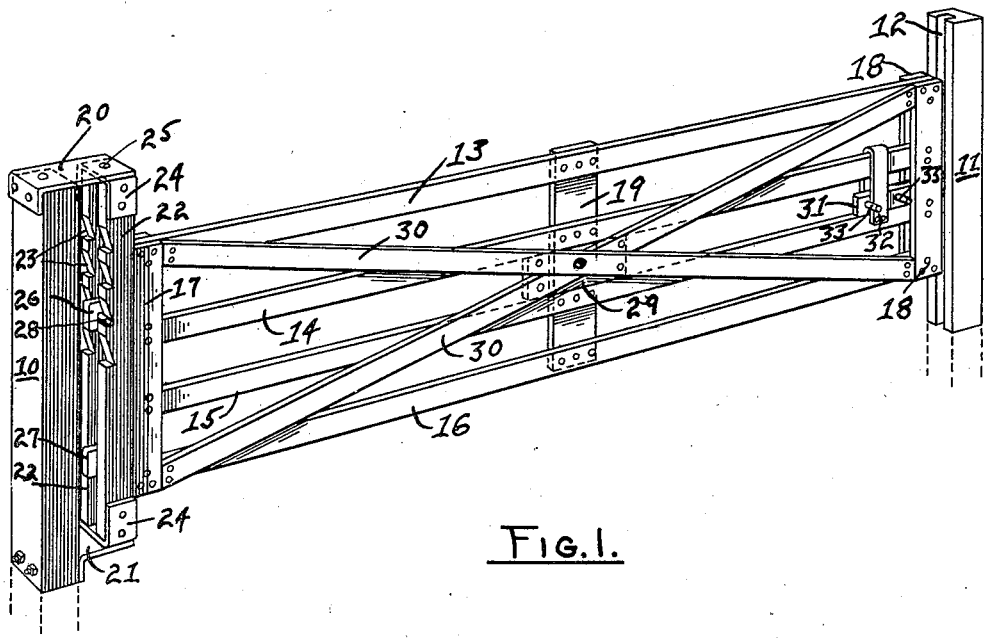
Figure 1 is a perspective view of one form of the gate.
Figure 2:
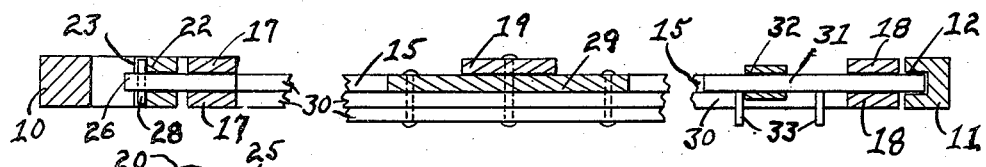
Figure 2 is a fragmentary horizontal sectional view of portions of the gate.

Referring then to the drawings wherein like parts of the structures shown are designated by the same numerals in the several views and firstly to Figures 1-3 thereof, the gate therein shown is disposed between a pair of spaced vertical gate posts 10, 11, here shown as squared in cross section, the post 11 having a vertical latch receiving slot or keeper 12 along its inner length.

The gate per se here shown comprises a plurality of vertically spaced horizontally disposed rails 13, 14, 15 and 16, secured together at their respective opposite ends between pairs of vertically disposed ties 17, 18 and by a vertically disposed tie 19 intermediate their lengths.

The upper end of the end post 10 is provided with a fixedly secured horizontally disposed inwardly projecting gate hanger 20 and with a similar lower spaced hanger 21 adjacent the ground. A pair of spaced vertically disposed gate ends 22, each provided with a plurality of spaced parallel companion notches 23 along their inner lengths, are secured together adjacent their respective opposite ends by U-shaped securing brackets or caps 24 and these brackets and their gate ends are pivotally disposed between the gate hangers 21, 22 by means of pintles 25.

A pair of vertically spaced horizontally disposed guide tongues 26, 27 are secured between the ties 17 in any suitable manner and in the assembled relation, these tongues extend outwardly from the inner end of the gate and between the spaced gate ends 22, the tongue 26 having a transversely disposed pin 28 projecting beyond its opposite sides adapted to be selectively seated within a companion pair of notches 23 for vertically adjustably hanging the gate. A third tongue 40 secured to and between the spaced gate ends 22 and projecting outwardly therefrom is adapted to engage the inner surface of the end post 10 to prevent sagging of the gate.

A block 29 disposed between the rails 14, 15 medially of their lengths is secured therebetween and to the tie 19 by means of a pair of cross rails or stretchers 30, each secured at one end adjacent the upper end of the rail 13 and adjacent the lower end of the rail 16.

A slidable latch 31 disposed between the rails 14, 15 adjacent their free ends and between a U-shaped member 32, is provided with spaced stops 33 disposed on opposite sides of said member for limiting the sliding movement of the latch into and out of its keeper 12.

Figure 4:
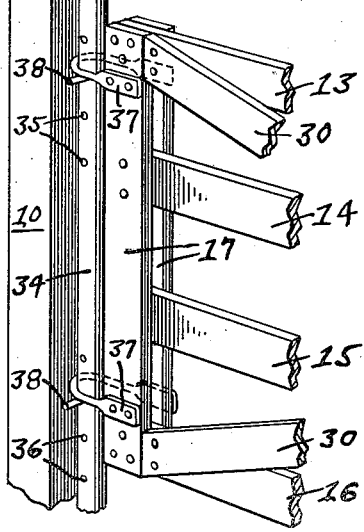
Figure 4 is a fragmentary perspective view of a modified form of the hinged end of a gate and its gate post.

In the modified construction shown in Figure 4, a tubular metal gate end 34 is pivotally hung between the gate hangers 21, 22 which gate end is provided with a plurality of vertically disposed spaced pin receiving apertures 35 adjacent its upper end and with a similar plurality of pin receiving apertures 36 adjacent its lower end.

The ties 17 are here shown as provided with a pair of vertically spaced U-shaped members 37, each embracing the tubular gate end 34 and supported on pins 38 removably and selectively inserted within the pin receiving apertures 35, 36 whereby the gate may be vertically adjusted relative to the ground therebelow.

It will thus be seen that the gates herein shown and described are each freely swingable, cannot sag and are readily vertically adjustable and while but several specific embodiments of the invention have been herein shown and described, it will be understood that certain details of the constructions shown may be altered or omitted without departing from the spirit of the invention as the same is defined in the following claim.

I claim:

A gate structure comprising a vertically disposed end post having spaced laterally projecting gate hangers, a pair of spaced vertically disposed gate ends swingably hung between the hangers and provided with a plurality of spaced parallel companion notches along their inner lengths, and a gate whose one end is provided with a pair of spaced projecting tongues disposed between the spaced gate ends, one of said tongues having a transversely disposed pin projecting beyond its opposite sides adapted to be selectively seated within a companion pair of notches for vertically adjustably hanging the gate.

PERRY E. VAN HORN.

REFERENCES CITED

The following references are of record in the file of this patent:

UNITED STATES PATENTS

| Number | Name | Date |
|---|---|---|
| 171,158 | Moore | Dec. 14, 1875 |
| 364,193 | Townsend | May 31, 1887 |
| 546,234 | Linsey et al. | Sept. 10, 1895 |
| 1,127,828 | Terry | Feb. 9, 1915 |
| 1,133,417 | Wenzelmann | Mar. 30, 1915 |
| 1,212,015 | Cassman | Jan. 9, 1917 |
| 1,518,309 | Crawford et al. | Dec. 9, 1924 |
| 1,521,371 | Hunter | Dec. 30, 1924 |

FOREIGN PATENTS

| Number | Country | Date |
|---|---|---|
| 171,846 | Canada | Sept. 12, 1916 |